(12) United States Patent
McBride

(10) Patent No.: US 7,361,270 B2
(45) Date of Patent: Apr. 22, 2008

(54) APPARATUS FOR WATER TREATMENT

(76) Inventor: John W. McBride, 2532 Greenwood-Cemetery Rd., Danville, IL (US) 61834

( * ) Notice: Subject to any disclaimer, the term of this patent is extended or adjusted under 35 U.S.C. 154(b) by 163 days.

(21) Appl. No.: 11/114,369

(22) Filed: Apr. 26, 2005

(65) Prior Publication Data

US 2005/0236336 A1 Oct. 27, 2005

Related U.S. Application Data

(60) Provisional application No. 60/565,789, filed on Apr. 27, 2004.

(51) Int. Cl.
*C02F 1/74* (2006.01)
(52) U.S. Cl. .................. 210/199; 210/205; 210/416.3; 261/122.1
(58) Field of Classification Search .................. 210/721
See application file for complete search history.

(56) References Cited

U.S. PATENT DOCUMENTS

| | | | |
|---|---|---|---|
| 4,210,613 A | 7/1980 | Webb | |
| 4,298,467 A * | 11/1981 | Gartner et al. | 210/96.1 |
| 4,451,361 A * | 5/1984 | Paterson | 210/136 |
| 4,555,335 A | 11/1985 | Burris | |
| 4,780,215 A | 10/1988 | Carlson | |
| 5,147,530 A | 9/1992 | Chandler | |
| 5,460,731 A | 10/1995 | St. Pierre | |
| 5,494,583 A | 2/1996 | Dieter | |
| 5,601,724 A | 2/1997 | St. Pierre | |
| 5,601,757 A * | 2/1997 | Biselli et al. | 261/122.1 |
| 5,614,086 A * | 3/1997 | Hill et al. | 210/170.06 |
| 5,618,417 A * | 4/1997 | Spindler | 210/170.06 |
| 5,725,759 A | 3/1998 | Schlafer | |
| 5,766,457 A | 6/1998 | Spindler | |
| 6,146,524 A * | 11/2000 | Story | 210/199 |
| 6,596,161 B2 * | 7/2003 | Kerfoot | 210/199 |

* cited by examiner

*Primary Examiner*—Peter A. Hruskoci
(74) *Attorney, Agent, or Firm*—Chase Law Firm, L.C.

(57) ABSTRACT

Water is treated by precipitating dissolved contaminants. A treatment vessel is provided having an inlet for receiving the water under treatment and an outlet for flowing treated water therefrom. A high volume of fine air bubbles are diffused into the water within the vessel as it flows therethrough, causing the water to assume an increased level of dissolved oxygen and thereby cause certain impurities within the water to oxidize and precipitate and flow with the water through the outlet.

6 Claims, 3 Drawing Sheets

APPARATUS FOR WATER TREATMENT

CROSS REFERENCE TO RELATED APPLICATIONS

This application claims the benefit of prior filed, now abandoned Ser. No. 60/565,789, filed Apr. 27, 2004, entitled METHOD AND APPARATUS FOR WATER TREATMENT.

BACKGROUND OF THE INVENTION

This invention relates to a system for treating water and more particularly to a method and apparatus for treating drinking water through intense aeration to cause the oxidation and precipitation of certain contaminants such as iron, manganese and arsenic.

Precipitation of contaminants is an important step in the treatment of drinking water. Typical devices that use aeration and oxidation to precipitate impurities include devices that use strike plates and baffles within mixing vessels to serve as collectors of sediment and to increase travel path and surface area for air/water interaction. For example Dieter, U.S. Pat. No. 5,494,583, discloses supplying air by Venturi action or pressurized air source to a mixing device. A series of baffles within the mixing device causes the air bubbles to reduce in size and mix with the water. This type of device relies on the baffles to cause mixing of the water and to provide sufficient surface area. While the specification discloses that precipitates are carried out of the mixing device by the flow of water it is known in the art that devices incorporating such baffles require frequent backwashing or other cleaning procedures to remove sediment.

Schlafer et al, U.S. Pat. No. 5,725,759, discloses a similar device that uses numerous perforated plastic balls to mix water within the mixing vessel and to provide increased surface area for air/water interaction. Such devices also require frequent cleaning to remove sediment. The patents to St. Pierre, U.S. Pat. Nos. 5,460,731 and 5,601,724, disclose a method whereby a stream of water is forced against an impaction target such as the top inner surface of the pressure vessel. The water then cascades through the vessel, first striking a plate and then striking the surface of liquid accumulated in the bottom of the vessel. Along with the problems of sediment buildup, such devices typically also cause a significant pressure drop in the water line.

BRIEF DESCRIPTION OF THE INVENTION

The present invention relates to an aeration vessel for oxidizing and precipitating certain impurities such as iron, manganese and arsenic in water, particularly well water. Structurally, the vessel is typically a cylinder with closed ends. One end includes a centrally located water intake defined by a flanged tube. Four air supply tubes with flanges are equally spaced about the central water intake and connect to exterior pressurized air supply lines. Inside the vessel, the air supply tubes are connected to elongated air diffusers that terminate at the opposite wall and are positioned in place by locating pins. An outflow tube is also located on this opposite wall. The outflow tube terminates with a flange on the exterior of the vessel.

In use, water is delivered to the vessel via the water intake tube. Pressurized air is delivered to the vessel via the air supply tubes and is dispersed as fine bubbles through the diffusers. Since the air is emitted from the diffusers at a high velocity, it causes agitation and mixing of the water inside the vessel. The considerable surface area presented by the air bubbles causes the water to become highly oxygenated. The increased oxygen content causes the oxidation of certain impurities dissolved in the water, which precipitate upon oxidation. The precipitates are carried along with the water and air bubbles through the outflow tube, thereby exiting the vessel. The precipitates may then be readily filtered by known particulate filtration means.

A particular advantage of the device is that it may be installed "in line," allowing undisrupted water flow. In addition, due to the heavy turbulence caused by the air bubbles, and the continual flow of water through the vessel, precipitates do not tend to settle within the vessel itself. The device, therefore, may be used continuously without the need for periodically flushing precipitates, cleaning baffles or other internal structures, or changing media.

Other advantages of the invention will become apparent from the following description taken in connection with the accompanying drawings, wherein is set forth by way of illustration and example, an embodiment of the present invention.

DETAILED DESCRIPTION

Figure 1:
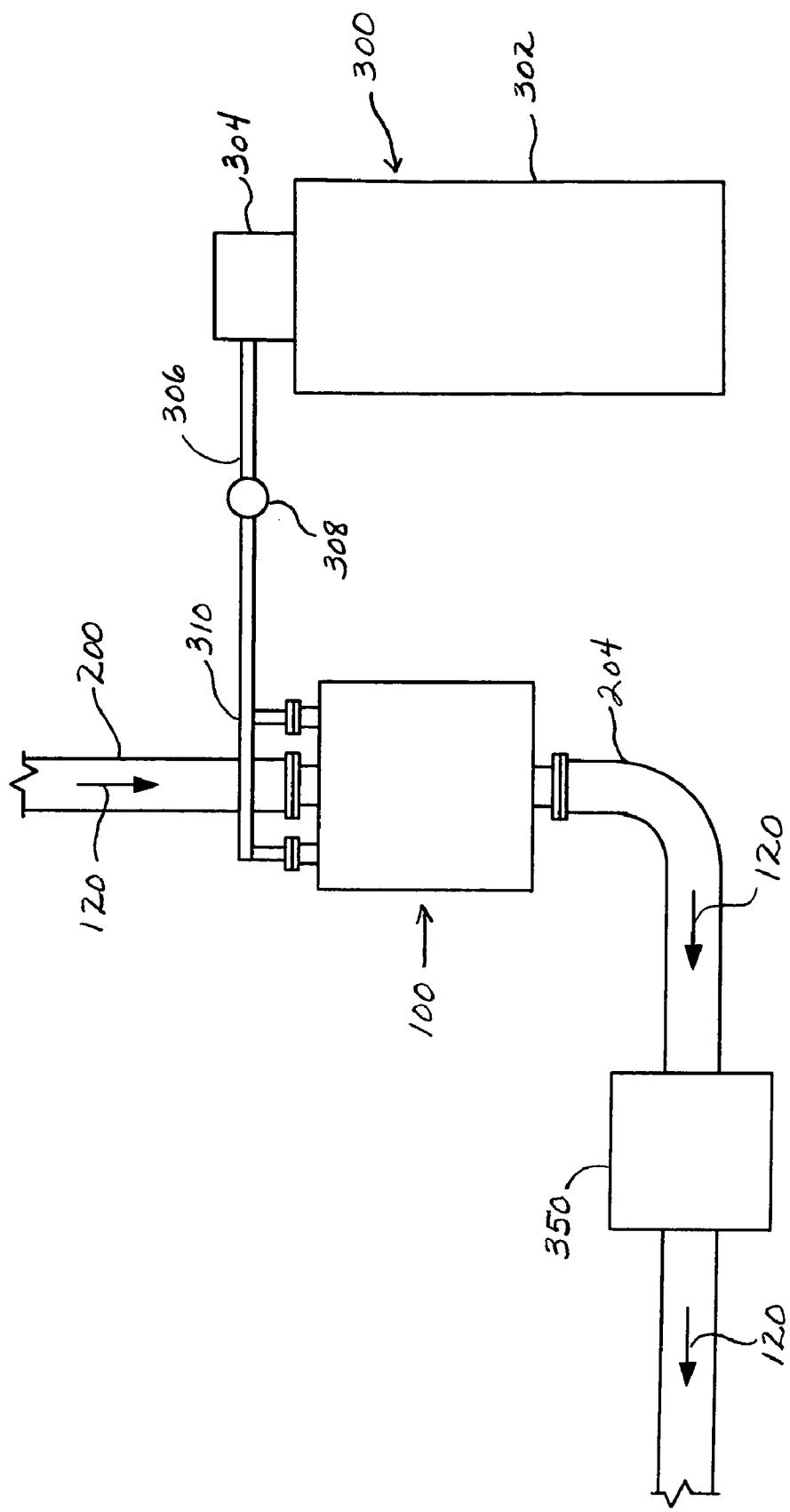
FIG. 1 is a schematic diagram of the treatment system.

Referring to FIG. 1, a system according to an embodiment of the present invention is shown and includes an aeration vessel 100 in fluid communication with a water supply or inlet conduit 200 that supplies water requiring treatment to the vessel 100. An outlet conduit 204 receives treated water and conveys the water to a post-treatment filter 350. Water flow is indicated generally by arrows 120.

The vessel 100 is supplied with pressurized air by a source such as an air compressor 300. The air compressor 300 typically includes an air storage tank 302 and a compressor motor 304. The compressor motor 304 may be regulated to engage only when water is provided to the vessel 100 for treatment. An air line 306 typically conveys pressurized air from the compressor 304 to a pressure regulator 308 and then to a manifold 310 for distribution to air diffusers located within the vessel 100.

Figure 2:
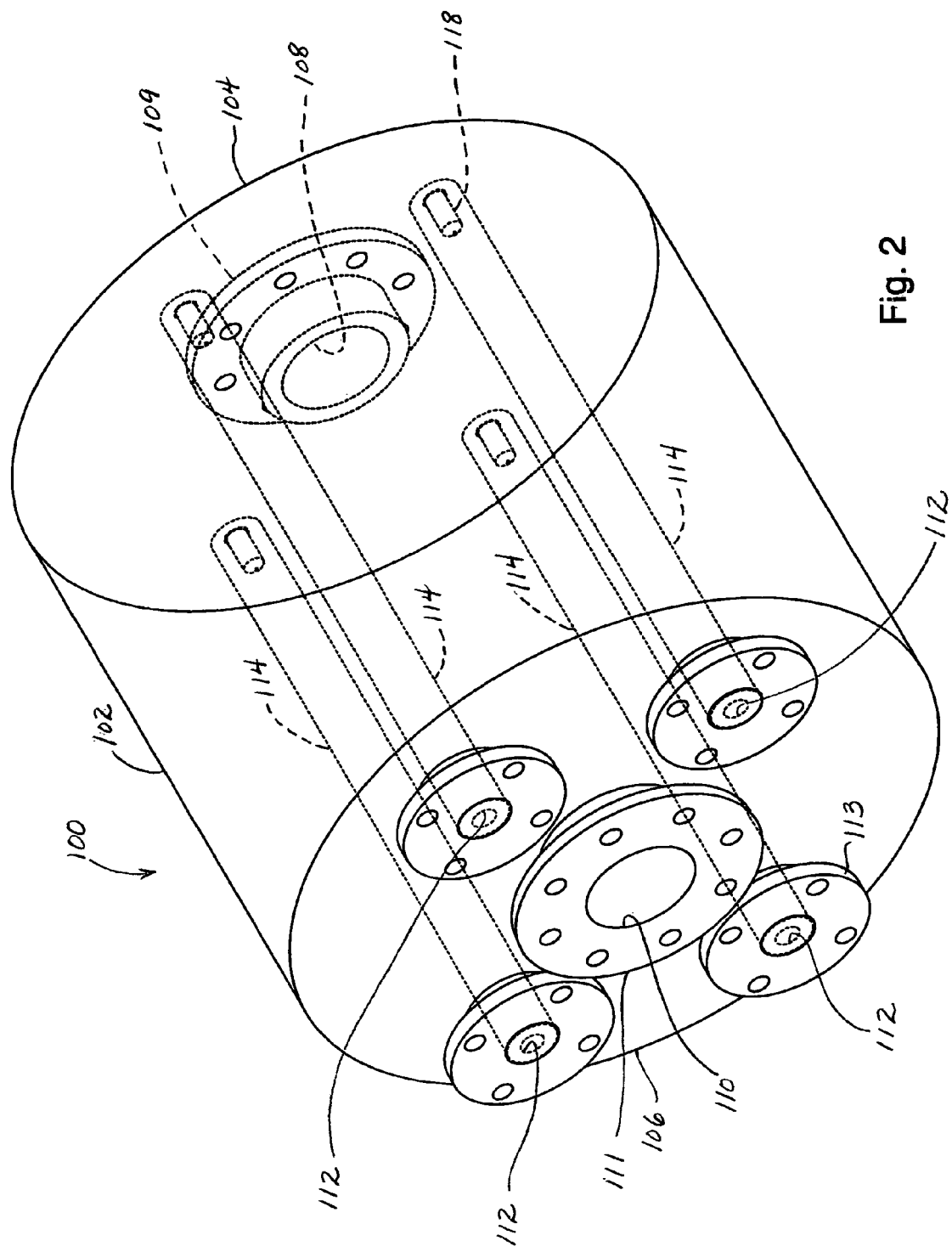
FIG. 2 is a perspective diagram of the aeration vessel.

FIG. 2 illustrates an embodiment of the aeration vessel 100 including a cylindrical side wall 102, closed on each end by an inlet wall 106 and an outlet wall 104. An inlet aperture 110 for receiving water into the vessel 100 is provided in the inlet wall 106. An outlet aperture 108 for flowing water from the vessel 100 is provided in the outlet wall 104. As shown, the inlet and outlet apertures 110 and 108 may include flanged fittings 111 and 109, respectively, to provide a means for connection to associated fluid inlet and outlet conduits 200 and 204. For example, the cylindrical vessel 100 may comprise a stainless steel cylinder approximately 24 inches in diameter and 36 inches long.

A plurality of elongated air diffuser tubes 114, four in the illustrated embodiment, are arranged within the vessel 100 equidistant from one another about the central axis of the vessel. Each diffuser tube 114 is in communication with an associated air-supply aperture 112 that passes through the inlet wall 106. As illustrated, each air-supply aperture 112 may be defined by an air-supply tube with a flanged fitting 113 to provide means for connection to the pressurized air supply 300. The end of each diffuser tube 114 opposite that of the air-supply aperture 112 is secured through engagement with posts 118 welded or otherwise attached to the inner surface of the outlet wall 104. For example, each of the diffuser tubes 114 may comprise a microporous diffusion membrane of rubber and polyethylene having an average pore size of approximately 50 microns made by Aeration Solutions, Inc. of Lexington, Tenn. Ceramic or other microporous diffusers may also be utilized.

Figure 3:
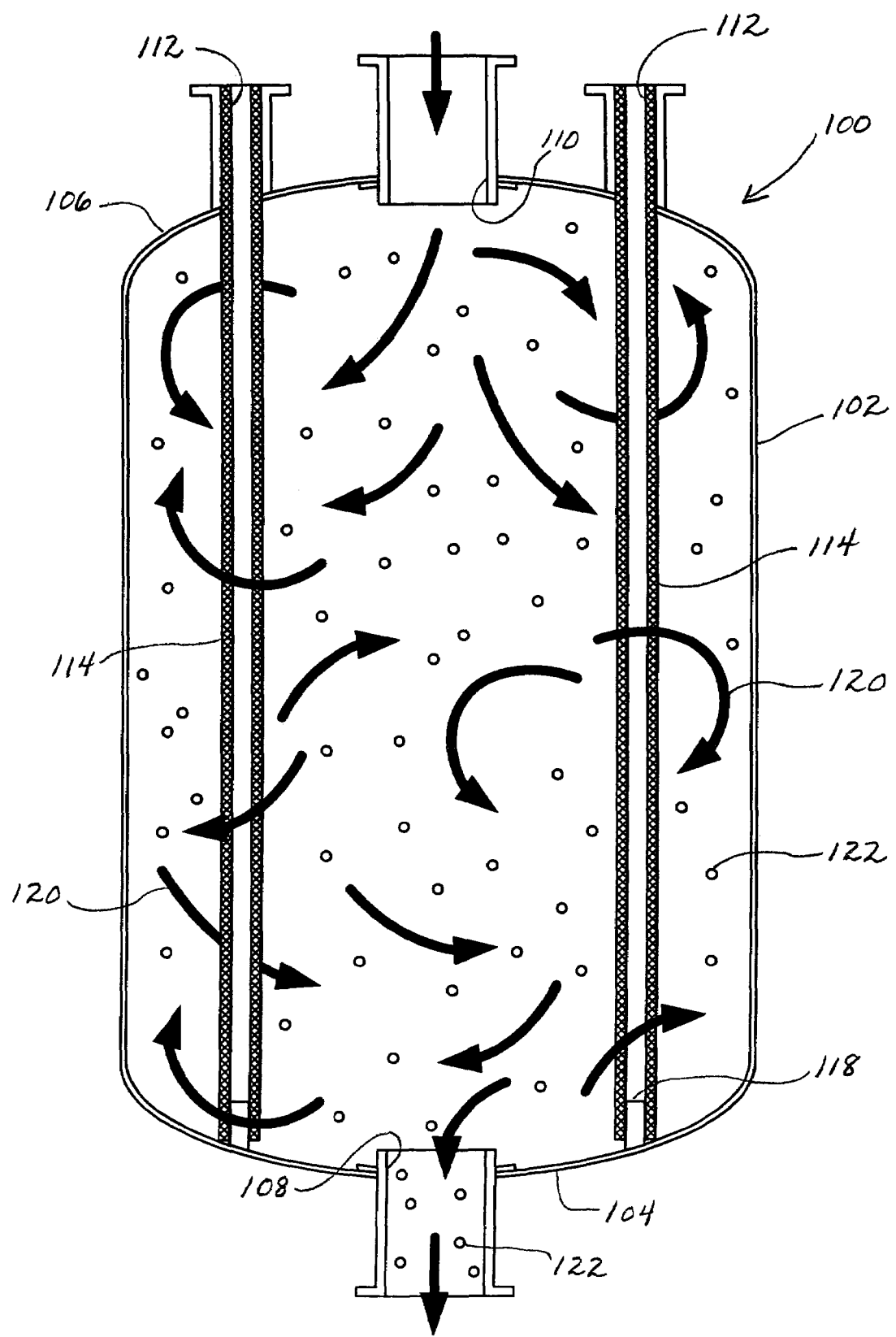
FIG. 3 is a sectional diagram showing the interior of the aeration vessel during

FIG. 3 is a sectional diagram showing the interior of the aeration vessel 100 during aeration. Water is supplied for treatment through inlet aperture 110 to fill vessel 100. Pressurized air is supplied to the diffusers 114 which emit a large quantity of fine bubbles. Because of the quantity and small size of the bubbles that may be generated through use of a fine pore diffuser, a considerable surface area is created enhancing uptake of dissolved oxygen by the water in the treatment vessel 100. Emission of the bubbles causes the water to agitate and swirl (as indicated by arrows 120) increasing the interaction between water residing in the vessel 100 and supplied air. Therefore, despite the high flow-through operation of the method provided, wherein water is supplied to the vessel 100 for treatment in a continuous flow, the residence time of water within the vessel 100 is sufficient for considerable oxygenation.

Water submitted for treatment, such as well-water, typically contains various impurities amenable to oxidation such as iron and manganese. When oxidized, these impurities form insoluble compounds that precipitate from the treated water. Arsenic is also removed as it binds to the iron precipitate. In treatment systems in the prior art, these precipitates accumulate as sediment within associated vessels and channels and on associated structures such as baffles or plates. In the present invention, precipitates 122 are simply flushed from the vessel 100 to be readily removed through conventional filtration means 350 (FIG. 1). Agitation of the water within the vessel 100 prevents precipitates from accumulating on interior surfaces of the vessel 100. Because of the preferred vertical orientation of the vessel 100, and of the elongated diffusers 114 within the vessel, horizontal surfaces that would be most likely to accumulate precipitates are minimized. Acceleration of water flow near the outlet 108 assists in removal of any precipitates that would otherwise accumulate on the outlet wall 104.

Comparison of inlet and outlet water from test wells in Watseka, Ill. confirmed that iron, manganese and arsenic are effectively removed utilizing the vessel 100 having a diameter of 24 inches and a length of 36 inches, and provided with four diffuser tubes 114. A water flow rate through the vessel of 300 gallons per minute was maintained by a pressure of 50 psig. Air under a pressure of 53-54 psig was applied to the diffusers by the compressor 300. Laboratory analysis showed that 95 to 100 percent of the iron and manganese was removed, reducing iron and manganese to from not detected to 0.09 mg/l from an untreated reading of 1.8 to 1.9 mg/l. Arsenic was reduced from 32 ppb to 9 ppb.

Therefore, a method of treating drinking water by precipitating dissolved contaminates according to the present invention may include providing vessel 100 for containing water, the vessel 100 including inlet 110 for receiving water and outlet 108 for flowing water from the vessel 100 after treatment, flowing water for treatment through the inlet 110 and into the vessel 100, diffusing a high volume of fine air bubbles into the water contained within the vessel 100, and flowing the water through the outlet 108 to exit the vessel 100. The air bubbles cause the water in the vessel 100 to agitate and assume an increased level of dissolved oxygen, thereby causing certain impurities within the water to oxidize, precipitate and flow with the water through the outlet 108. This method may include providing a plurality of elongated air diffusers 114 within the vessel 100 as illustrated.

An apparatus for treating drinking water through precipitation of dissolved contaminates according to the present invention may include vessel 100 for retaining water for treatment, the vessel 100 including inlet 110 in fluid communication with a water source for delivering water to the vessel 100, and outlet 108 for flowing water from the vessel 100 subsequent to treatment. The plurality of elongated air diffusers 114 are disposed within the vessel 100 and arranged in spaced relationship to one another. The air diffusers 114 are in communication with the air delivery source 300 (such as an air compressor or pressurized air tank) that provides means for delivering air under sufficient pressure to the diffusers 114 to cause the diffusers 114 to emit air bubbles into water contained within the vessel 100 under normal operating fluid pressure. As water flows through the vessel 100, air is emitted from the diffusers 114 as fine bubbles and in sufficient velocity and volume to substantially agitate the water flowing through the vessel 100, thereby highly oxygenating the water and causing the oxidation and precipitation of certain impurities, such as iron, manganese and arsenic. The precipitates exit the vessel 100 with the treated water through the outlet 108. The apparatus may further include outlet conduit 204 in fluid communication with the outlet 108, and filter 350 in fluid communication with the outlet conduit 204 so that precipitates flowing from the vessel 100 are removed from the water.

It is to be understood that while certain forms of this invention have been illustrated and described, it is not limited thereto, except insofar as such limitations are included in the following claims.

Having thus described the invention, what is claimed as new and desired to be secured by Letters Patent is as follows:

1. An apparatus for treating water through precipitation of dissolved contaminates, said apparatus comprising:
   a vessel for receiving water for treatment, said vessel including an inlet adapted for communication with a water source for receiving a flow of water through an inlet wall of said vessel, and to an outlet provided in an outlet wall of said vessel for discharging water from said vessel subsequent to treatment,
   a plurality of elongated air diffusers disposed within said vessel, spaced from one another, each of said diffusers having an air-supply aperture at one end thereof spaced about said inlet, and passing through said inlet wall, wherein each of said diffusers terminates substantially at said outlet wall
   an air delivery source communicating with said diffusers for delivering air thereto at said apertures under sufficient pressure to cause said diffusers to emit fine air bubbles into water under treatment in said vessel, in sufficient velocity and volume to substantially agitate the water flowing through said vessel, thereby highly oxygenating the water and causing the oxidation and precipitation of certain impurities to form precipitates which exit the vessel with the treated water through said outlet.

2. The apparatus as claimed in claim 1, further comprising an outlet conduit in fluid communication with said outlet, and a filter in said outlet conduit for removing said precipitates flowing from said vessel.

3. The apparatus as claimed in claim 1, wherein said air delivery source includes an air compressor.

4. The apparatus as claimed in claim 1, wherein said air diffusers are microporous.

5. The apparatus as claimed in claim 1, wherein each of said diffusers comprises an elongated, microporous diffusion membrane.

6. The apparatus as claimed in claim 5, wherein each of said membranes has an average pore size of approximately 50 microns.

* * * * *